July 18, 1967  R. KAUFHOLD ET AL  3,331,191
PROCESS FOR PREPARING PURE GASEOUS FORMALDEHYDE
Filed April 16, 1965
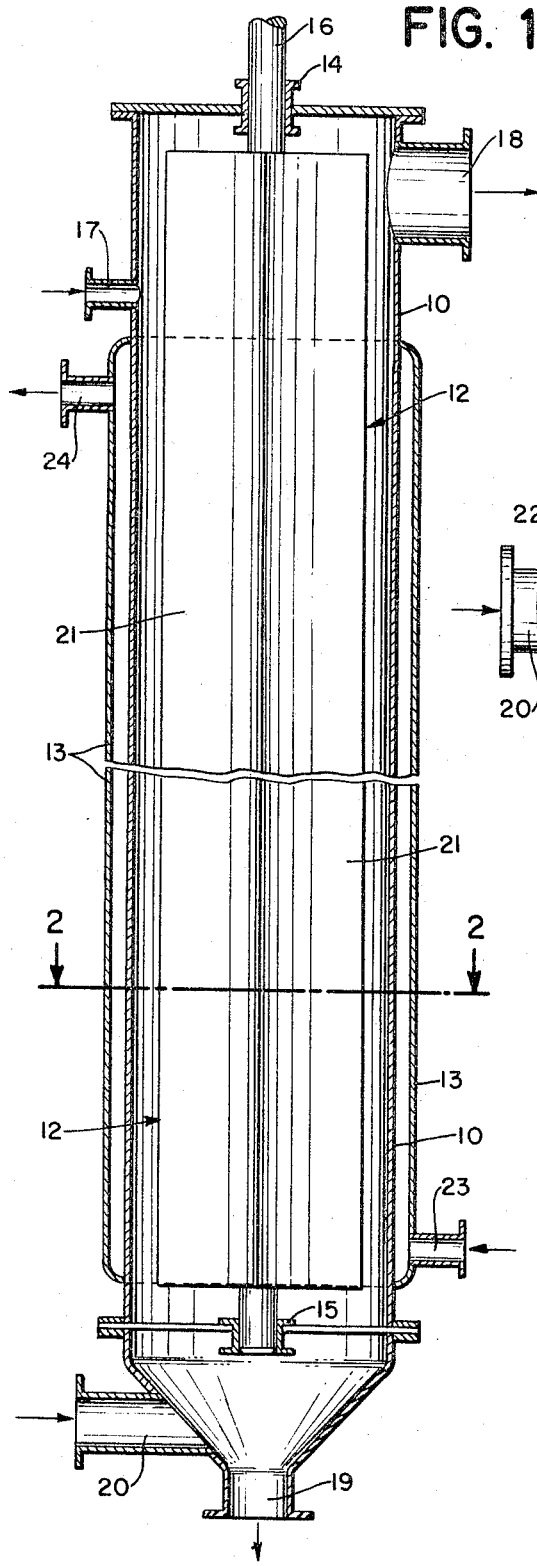
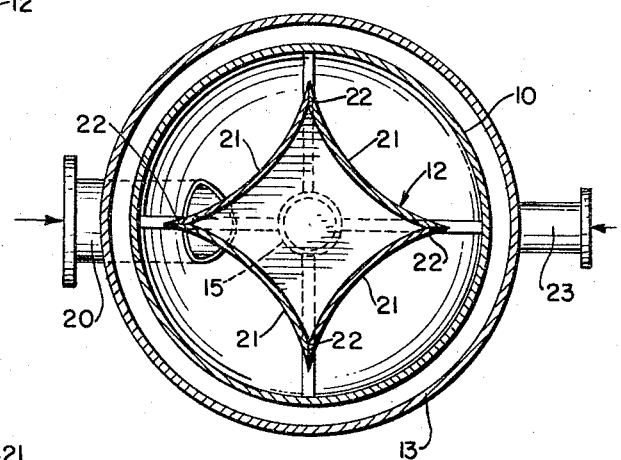
INVENTORS
ROBERT KAUFHOLD
BERND HAASE
ROLF KLOSS

United States Patent Office 3,331,191
Patented July 18, 1967

---

3,331,191
PROCESS FOR PREPARING PURE GASEOUS FORMALDEHYDE
Robert Kaufhold and Bernd Haase, Leuna, and Rolf Kloss, Merseburg, Germany, assignors to VEB Leuna-Werke "Walter Ulbricht," Leuna, Germany
Filed Apr. 16, 1965, Ser. No. 448,648
5 Claims. (Cl. 55—91)

The present invention relates to a process for preparing pure gaseous formaldehyde.

It is the object of the present invention to provide a process for making pure formaldehyde in gaseous state in order to obtain a gas which is particularly useful in the preparation of high molecular polyformaldehyde.

As a rule, formaldehyde gases are polluted by by-products such as water, methanol, formic acid, methylformate and other normally liquid substances whose elimination from formaldehyde gas presents considerable difficulties in technical processes, because the said impurities tend to bring about formation of solid low polymers at temperatures belowe 100° C. which frequently cause disturbances in the production that require complicated equipment for elimination.

An attempt has been made to overcome the above mentioned shortcomings by effecting the purification of formaldehyde with polyethylene glycol compounds that are inert with respect to formaldehyde at higher temperatures. The purification thus effected is, however, not very satisfactory.

Other known processes use solid absorbents or adsorbents for the purification of formaldehyde gas, for instance phosphorus pentoxide or silicates. These methods, too, are not without disadvantages. When absorption is carried out, considerable amounts of lower polymers are obtained in mixture with the absorbent, whereas in the adsorption process the regeneration of the adsorbent is cumbersome and expensive. Also, undesirable side reactions will occur in the last mentioned method.

Yet other known processes operate by cooling of formaldehyde gases in the presence of inert solvents or mixtures of solvents in which case the impurities attached to lower molecular polyformaldehyde will be obtained as suspensions. This mode of operation suffers from considerable formaldehyde losses and does not permit continuous operation, since polymerization sets in preferably at the walls of vessels which necessitates dicontinuation of the process and resetting of the cleaning apparatus.

Finally it is known to wash formaldehyde gas in contact with a film of hemiacetal, in unidirectional or counter-current. For carrying out the process a straight, smooth-walled tube is used, but the tube may also be coil-shaped or bulb-shaped and provided with guide plates or baffles or ribs, and equipped with filling bodies. Experience, however, showed that operation over an extended time can only be carried out with a smooth vertical tube. For technical purposes, bundles of smooth tubes have been suggested whose walls can be completely wetted. Even so, great difficulties are encountered in practical application. Thus, the even distribution of the hemiacetal in the tubes presents a problem, particularly in view of the fact that polymerization sets in primarily at the charging inlet. When using hemiacetals with high formaldehyde contents, it is furthermore difficult properly to control the temperature of the tubes so as to accomplish a proper deposit of the impurities while avoiding clogging of the tubes. The greatest difficulty, however, is insufficient separation of the impurities, which condense in the gas current, a separation which can only be satisfactorily accomplished in long, narrow tubes. In that case, however, large losses of formaldehyde by absorption in the hemiacetal are incurred.

It is, therefore, an object of the present invention to provide a process for the preparation of pure formaldehyde gas which is free of the above-mentioned shortcomings of the processes hitherto in use, and which is simple and inexpensive and can be carried out without obstruction in the tubes, thereby affording means for uninterrupted operation on a large scale.

Other objects and advantages of the process according to the invention will become apparent from the following detailed specification.

It has now been found that the above objects can be achieved by making the impure formaldehyde gas contact a film of a rinsing liquid passing down the wall of a tube, in which a heatable rotor is coaxially arranged; the rotor is made to revolve during the cleaning operation while heated to a temperature of at least 70° C. The rinsing liquid is passed into the tube at a temperature of between $-20°$ C. and $+130°$ C. The temperature of the rotor and of the rinsing liquid is so adjusted with respect to each other—if necessary by a cooling of the tube wall—that the formaldehyde gas to be purified will be cooled down to 80° C. or less.

In the accompanying drawing an apparatus is shown which can be used for carrying out the process according to the invention.

In the drawing:

FIG. 1 is a schematic illustration of the apparatus in elevation; and

FIG. 2 is a section along line 2—2 of FIG. 1.

The apparatus comprises a vertically arranged elongated tube 10 consisting of austenitic chrome nickel steel. Coaxially arranged with the tube 10 is a rotor 12 which comprises four concave elements 21 as may be seen in FIG. 2, which are joined together at 22. The rotor therefore contains a hollow space which may be heated and which is driven from a shaft 16. Members 14 and 15 at the top and bottom ends serve as bearings for shaft 16.

Tube 10 is provided with an outer cooling jacket 13 starting at the bottom end of the tube. The tube has an inlet 17 for hemiacetal and an outlet 18 for gaseous formaldehyde. At the bottom, where the tube ends in a conical portion, there are the inlet tube 20 for formaldehyde and the outlet tube 19 for hemiacetal. A cooling medium enters the cooling jacket at 23 and is discharged at the top of the jacket at 24.

In carrying out the process according to the invention the gas may be conducted in unidirectional or counter-current when contacted with the film of the rinsing liquid.

Especially when using the hemiacetal process for producing formaldehyde gas, we may use as rinsing liquids higher alcohols and/or their hemiacetals; in that case, the temperature at which the rinsing liquid is charged onto the tube wall is between $-20$ and $+80°$ C.

Other liquids may likewise be used for rinsing, e.g. hydrocarbons, chlorinated hydrocarbons, esters, or ethers. It is advantageous to use liquids having a high solvent property for formaldehyde so that the impurities will be obtained in a solution of formaldehyde and will not be attached to formaldehyde in the form of suspensions.

When a glycol-glycol hemiacetal mixture is used as rinsing liquid, there will be obtained a gas useful for preparing high polymer formaldehyde even when the temperature of the rotor and of the rinsing liquid will be so adjusted (with additional cooling of the wall temperature of the tube), that the temperature of the formaldehyde gas is at 60° C., but with lower temperatures a greater degree of purity of the gas can be obtained.

A more forceful cooling of the tube wall will be required, if the formaldehyde gas to be purified contains a comparatively large amount of water, or when a rinsing liquid is used which consists of hemiacetals, whose alcoholic component has a relatively high vapor pressure.

The rotor arranged in the tube serves for forming a film of rinsing liquid which passes along the tube wall or for maintaining such a film; furthermore, for bringing about a thorough contact between the film and the gas current and to convey any condensed polymerized particles into the liquid film by centrifugal action. The effects of the rotor are increased by using a rotor having two or several vertical wings or blades.

The peripheral speed of the rotor is preferably between 8 and 20 m./sec. The best speed in any individual case can be found empirically without difficulty. If in gases having the same degree of impurity, at a certain throughput of gas the peripheral speed of the rotor is increased, a purer gas will be obtained.

In the following, a number of examples will be given for a more detailed description of the process according to the invention, but it should be understood that they are given by way of illustration and not of limitation, and that many changes in the details can be made without departing from the spirit of the invention.

*Example 1*

The apparatus used consists of a vertical tube made of austenitic chrome nickel steel of 2 m. length and internal diameter of 200 mm. Within the tube, a rotor having 6 blades is coaxially arranged, said rotor having a hollow shaft to be heated from the inside and having the blade edges spaced 3 mm. from the wall of the tube. On the outside of the tube, a heating jacket is provided which starts at the bottom end and extends to a height of 1.8 m. At the top end of the tube, there are three short inlet tubes tangentially arranged and equally spaced over the circumference of the vertical tube, said short inlet tubes serving for the feed-in of rinsing liquid.

60 to 62 kg. per hour of formaldehyde gas containing 9500 p.p.m. water, 1200 p.p.m. methanol and 1020 p.p.m. formic acid as impurities, were introduced into the apparatus at a temperature of 50° C. at the bottom end of the tube. Simultaneously, the tube is charged through the short tangential inlet tubes with 200 kg. per hour of a glycol-glycol hemiacetal mixture having a content of 43.5% formaldehyde, 0.1% water, 0.08% methanol, and 0.18% formic acid; all percentages being by weight. The mixture is flowing down in the form of a closed film along the inner wall of the tube. The temperature of the mixture when introduced was 20° C. Through the cooling jacket of the tube, 2 m.$^3$ of water at a temperature of 12° C. were passed per hour. The rotor was operated at an r.p.m. of 1200 and was maintained at a mean temperature of 80° C. by circulating heated glycol. The formaldehyde gas ascending in the tube was cooled by the glycol-glycol hemiacetal film with the impurities passing largely from the formaldehyde gas into the liquid film where they are absorbed. At the top of the tube, 50–52 kg. of formaldehyde gas having a temperature of 45° C. were discharged per hour. Remaining in the gas are impurities comprising 491 p.p.m. water, 240 p.p.m. methanol, and 25 p.p.m. formic acid. At the bottom end, 210 kg. of the glycol-glycol hemiacetal mixture having a temperature of 86–88° C. were received per hour containing 47.5% formaldehyde, 0.3% water, 0.1% methanol, and 0.2% formic acid.

During an operational time of more than 500 hours, no deposits of polymers interfering with the purification of the formaldehyde gas were noticed in the apparatus.

*Example 2*

A similar apparatus was used as the one described in Example 1, but with the following differences: the length of the tube was 4 m. and the one of the cooling jacket 3.7 m. A rotor was arranged which had a horizontal cross-section of a triangle, with inwardly curved concave faces.

50 kg. formaldehyde gas containing 8100 p.p.m. water, 2800 p.p.m. methanol, and 620 p.p.m. formic acid as impurities were charged hourly into the apparatus into the top at a temperature of 100° C. Simultaneously, 200 liters diesel oil, purified by hydrogenating refining and by passing over molecular sieves, were introduced hourly through the short tangential inlet tubes and passed over the inner wall of the vertical tube as a closed film. The temperature of the diesel oil was 100° C. Through the cooling jacket of the tube, 6 m.$^3$ cooling brine having a temperature of −10° C. were passed hourly. The rotor operated at an r.p.m. of 2000 and was maintained at a mean temperature of 95° C. by circulating heated glycol. At the bottom end of the tube formaldehyde gas was separated from the suspension of polyformaldehyde and diesel oil which had formed during operation. At this place, 44 kg. formaldehyde gas having a temperature of 45° C., are discharged from the tube. The impurities in the gas were 236 p.p.m. water, 157 p.p.m. methanol, 29 p.p.m. formic acid. At the bottom end of the tube, the diesel oil polyformaldehyde suspension simultaneously escaped from the tube at a temperature of 32° C. It contained 10% of the formaldehyde gas used in starting as low molecular polyformaldehyde to which the impurities of the starting gas were mostly attached.

After an operational time of 400 hours, there was only a slight deposit of polymers in the apparatus which did not interfere with the purification of the formaldehyde gas.

What we claim is:

1. A process for preparing pure gaseous formaldehyde from a crude formaldehyde-containing gas mixture, wherein a rotary movement is imparted to said gas mixture within a tubular vessel, in which the gas is contacted with a rinsing liquid said process consisting of the following steps:
   (a) arranging said tubular vessel in vertical position and admitting said rinsing liquid at a temperature lying between −20° C. and +130° C. in a manner to flow down vertically along the wall of said tubular vessel;
   (b) separately admitting said impure mixture of formaldehyde-containing gas, at a temperature in the range of 20–100° C.;
   (c) agitating said mixture by heatable means concentrically arranged within said tubular vessel, and raising the temperature of said means to at least 70° C.;
   (d) imparting to said agitating means a rotary movement causing said gaseous mixture to impinge on the wall of said vessel and become intimately contacted with the rinsing agent while the latter is being cooled so as to bring down the temperature of the formaldehyde-containing gas to be purified to a range of 10–80° C.

2. The process as claimed in claim 1, wherein the rinsing liquid used is a member selected from the group consisting of higher alcohols, hemiacetals thereof, and a mixture of the same.

3. The process as claimed in claim 2, wherein the rinsing liquid is admitted at a temperature between −20° C. and +80° C.

4. The process as claimed in claim 2, wherein the wall temperature is reduced by additional cooling when the rinsing liquid is a hemiacetal of an alcohol having a high vapor pressure.

5. The process as claimed in claim 1, wherein the wall temperature is reduced by additional cooling when the crude formaldehyde-containing mixture is rich in water.

References Cited

UNITED STATES PATENTS

| 709,527 | 9/1902 | Theisen | 55—91 |
| 3,169,840 | 2/1965 | Wood | 55—29 |
| 3,199,265 | 8/1965 | Takahashi et al. | 55—86 X |
| 3,201,917 | 8/1965 | Wood | 55—29 X |
| 3,226,444 | 12/1965 | Fischer et al. | 260—606 |

REUBEN FRIEDMAN, *Primary Examiner.*

J. ADEE, *Assistant Examiner.*